(12) United States Patent
Kawamura et al.

(10) Patent No.: US 11,567,275 B2
(45) Date of Patent: Jan. 31, 2023

(54) OPTICAL MODULE

(71) Applicant: Nippon Telegraph and Telephone Corporation, Tokyo (JP)

(72) Inventors: Yuriko Kawamura, Musashino (JP); Yusuke Nasu, Musashino (JP); Kiyofumi Kikuchi, Musashino (JP); Shunichi Soma, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 100 days.

(21) Appl. No.: 17/265,953

(22) PCT Filed: Aug. 14, 2019

(86) PCT No.: PCT/JP2019/031973
§ 371 (c)(1),
(2) Date: Feb. 4, 2021

(87) PCT Pub. No.: WO2020/040022
PCT Pub. Date: Feb. 27, 2020

(65) Prior Publication Data
US 2021/0382249 A1    Dec. 9, 2021

(30) Foreign Application Priority Data
Aug. 24, 2018    (JP) .............................. JP2018-157386

(51) Int. Cl.
*G02B 6/42* (2006.01)
*G02B 6/46* (2006.01)

(52) U.S. Cl.
CPC ......... *G02B 6/4257* (2013.01); *G02B 6/4239* (2013.01); *G02B 6/4285* (2013.01); *G02B 6/46* (2013.01)

(58) Field of Classification Search
None
See application file for complete search history.

(56) References Cited

U.S. PATENT DOCUMENTS

2003/0031418 A1    2/2003    Yoshikawa
2006/0002664 A1*   1/2006    Benzoni ................. G02B 6/423
                                                         385/88
(Continued)

FOREIGN PATENT DOCUMENTS

CN    102914836 A  *  2/2013  ............... G02B 6/10
JP    2001296436 A     10/2001
(Continued)

OTHER PUBLICATIONS

H. Tanobe et al., *Compact 100Gb/s DP-QPSK Integrated Receiver Module Employing Three-Dimensional Assembly Technology*, Optics Express, vol. 22, No. 5, Mar. 10, 2014, pp. 6108-6113.

*Primary Examiner* — Michelle R Connelly
(74) *Attorney, Agent, or Firm* — Workman Nydegger

(57) ABSTRACT

An optical module with optical fibers is intended to be able to be easily sucked and conveyed, and mounted on another substrate. An optical module of the present disclosure includes an optical device to which optical fibers are optically connected; and a carrier including a substrate and an adhesive layer formed at a surface of the substrate, and a part of the optical device and a part of the optical fibers are adhesively fixed on a surface of the adhesive layer. The optical device may include ball grid array shaped electrodes. The carrier may be provided with a plurality of holes.

7 Claims, 8 Drawing Sheets

(56) References Cited

U.S. PATENT DOCUMENTS

| | | | | |
|---|---|---|---|---|
| 2010/0232744 A1* | 9/2010 | Asai | ........................ | G02B 6/43 |
| | | | | 385/14 |
| 2016/0274321 A1* | 9/2016 | McClean | ............... | G02B 6/421 |
| 2019/0369339 A1* | 12/2019 | Knickerbocker | .... | G02B 6/4239 |

FOREIGN PATENT DOCUMENTS

| JP | 2002107594 A | * | 4/2002 | ............ G02B 6/423 |
|---|---|---|---|---|
| JP | 2003-048066 A | | 2/2003 | |
| JP | 2003048066 A | | 2/2003 | |
| JP | 2007-114369 A | | 5/2007 | |
| JP | 2007114369 A | | 5/2007 | |
| JP | 2018-508827 A | | 3/2018 | |

* cited by examiner

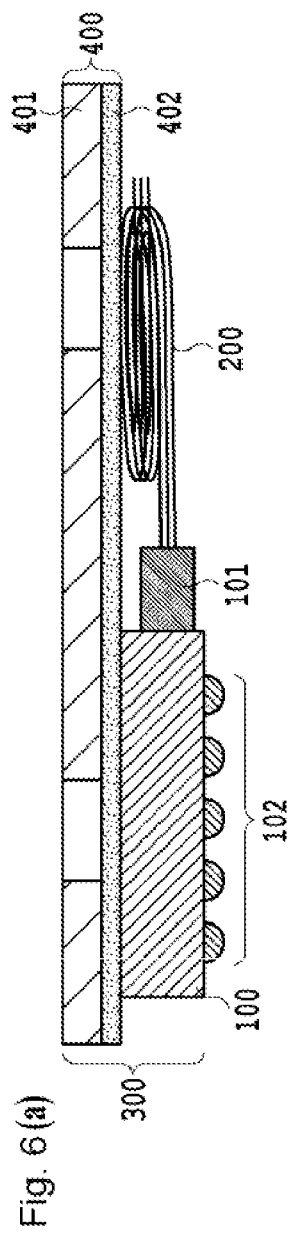
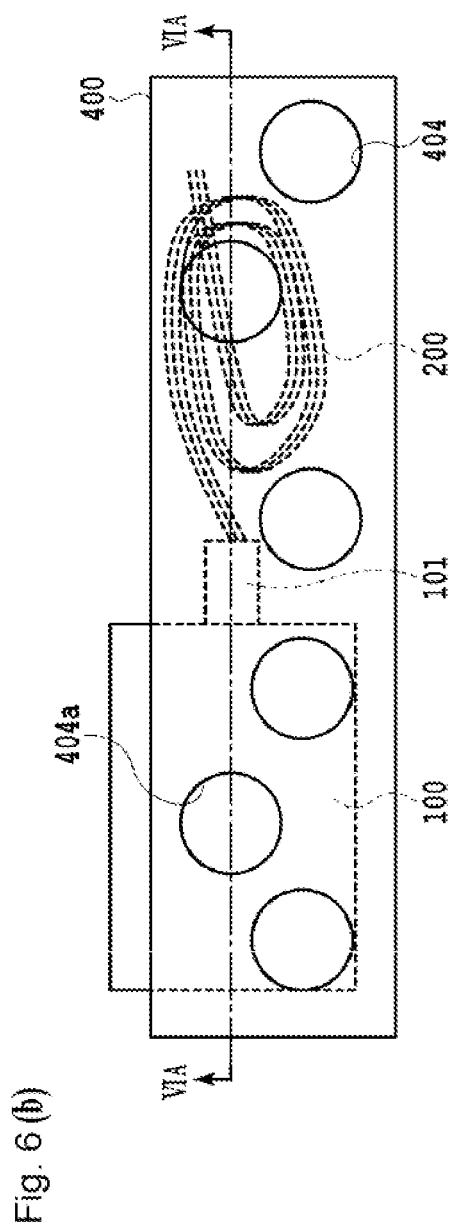
Fig. 6(a)
Fig. 6(b)

OPTICAL MODULE

TECHNICAL FIELD

The present disclosure relates to a component for optical communication for transmitting and executing signal processing on high frequency electrical signals and optical signals, and more particularly relates to an optical module that can be reflowed having a carrier on which an optical device portion and an optical fiber portion are adhesively fixed, so that suction conveyance and mounting can be performed using a mounter and the like.

BACKGROUND ART

Due to a rapid increase in communication demand, efforts for implementing large-capacity communication networks have been vigorously made. There has also been a strong demand for optical modules to have more integrated functions and to be more downsized, for increasing a bit rate per unit volume of communication equipment. Ball Grid Array (BGA) can achieve a dense array of a large number of electrical interfaces, and thus is a key technique for downsizing optical modules (Non Patent Literature 1). Furthermore, a BGA package is mounted on a substrate by reflow mounting, and thus is expected to achieve a lower mounting cost as compared with a case where related-art optical modules in which butterfly-style packages or flexible printed substrate (Flexible Printed Circuits (FPC)) packages are used is mounted by soldering.

CITATION LIST

Non Patent Literature

Non Patent Literature 1: H. Tanobe, Y. Kurata, Y. Nakanishi, H. Fukuyama, M. Itoh, and E. Yoshida, "Compact 100 Gb/s DP-QPSK integrated receiver module employing three-dimensional assembly technology," OPTICS EXPRESS, 2014, vol. 22, No. 5, pp. 6108 to 6113.

SUMMARY OF THE INVENTION

Technical Problem

FIGS. 1(a) and 1(b) are respectively a side view and a top view of a related-art optical device with an optical fiber. Unlike electronic devices, the optical module generally includes an optical device 100, optical fibers 200 through which an optical signal is input and output, and an optical fiber block 101 with which the optical device 100 and the optical fibers 200 are optically coupled to each other, as illustrated in FIGS. 1(a) and 1(b). The optical fibers 200 are deformed by heat. Thus, a reflow process on the optical module connected to the optical fibers 200 involves a risk of the optical fiber 200 largely and randomly moving within the furnace. Such a behavior of the optical fibers 200 may even cause the movement of the optical module itself, leading to a risk that the BGA might fail to be mounted at a desired position to result in conduction failure. The downsized optical modules are desirably sucked and conveyed to a predetermined position by a mounter and the like, for the sake of simplifying the mounting process. Unfortunately, the optical module with the optical fibers 200 provided to the optical device 100 is difficult to sucked and conveyed using a typical mounter because the optical fiber hinders these operations.

As one possible solution to this problem, the optical fiber may be wound around a reel and secured on the optical device. However, this requires a complex step of winding the optical fiber around the reel. Furthermore, the reel height is added to the optical module height, rendering the mounting in typical reflow furnace impossible because such furnaces do not support parts with such a high height.

The present disclosure has been made in view of the above-mentioned problems, and an object thereof is to provide an optical module that can be reflowed and includes a carrier on which an optical device and optical fibers can be adhesively fixed so that suction conveyance and mounting can be performed using a mounter and the like.

Means for Solving the Problem

The present disclosure includes the following configurations to achieve such an object.

A first aspect of an optical module of the present disclosure includes an optical device to which N optical fibers are optically connected, N being a positive integer, and a carrier including a substrate and an adhesive layer formed at a surface of the substrate, in which an adhesive fixing of at least a part of the optical device and at least a part of the N optical fibers are performed on a surface of the adhesive layer.

In a second aspect of the optical module of the present disclosure, according to the first aspect, the optical device includes ball grid array shaped electrodes.

In a third aspect of the optical module of the present disclosure, according to the first aspect or the second aspect, the adhesive fixing is performed so that the carrier partially overlaps with the optical device when viewed from above the carrier.

In a fourth aspect of the optical module of the present disclosure, according to any one of the first to third aspects, the substrate and the adhesive of the carrier are provided with a plurality of holes.

In a fifth aspect of the optical module of the present disclosure, according to any one of the first to third aspects, in the carrier, only the substrate is provided with a plurality of holes and the adhesive layer is provided with no hole.

In a sixth aspect of the optical module of the present disclosure, according to any one of the first aspect to the fifth aspect, a peeling film is disposed between the adhesive layer and the optical device and between the adhesive layer and the N optical fibers, in order to peel off the optical device and the N optical fibers from the adhesive layer of the carrier.

In a seventh aspect of the optical module of the present disclosure, according to any one of the first to sixth aspects, a peeling prevention member is disposed on a non-adhered surface of the N optical fibers fixed to the carrier.

In an eighth aspect of the optical module of the present disclosure, according to the seventh aspect, it is a film, or is a strip-shaped or mesh-shaped member.

Effects of the Invention

With the present disclosure, it is possible to provide an optical module that can be reflowed having a carrier on which an optical device portion and optical fiber portion are adhesively fixed, so that suction conveyance and mounting can be performed using a mounter and the like.

BRIEF DESCRIPTION OF DRAWINGS

FIG. 6(a) is a cross-sectional view of an optical module according to a fifth embodiment of the present disclosure. FIG. 6(b) is a top view of the optical module according to the fifth embodiment of the present disclosure.

DESCRIPTION OF EMBODIMENTS

Figure 1:
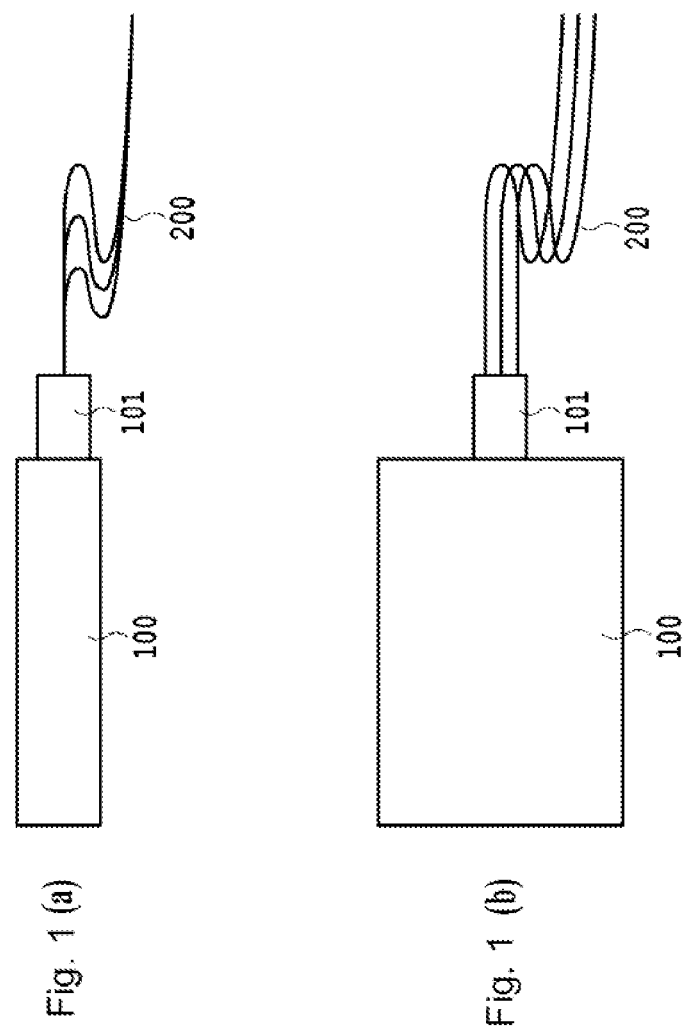
FIG. 1(a) is a side view of a related-art optical device with optical fibers.
FIG. 1(b) is a top view of the related-art optical device with optical fibers.

Embodiments of the present disclosure will be described below in detail with reference to the drawings. Note that, in the drawings, components with the same function are denoted with the same reference signs for the sake of clear description. However, it is obvious to those skilled in the art that the present disclosure is not limited to the description of the embodiments described below, and the mode and the detail thereof can be changed in various ways without departing from the spirit of the disclosure disclosed in this specification and the like. Furthermore, the configurations according to different embodiments can be combined as appropriate to be implemented.

First Embodiment

Figure 2:
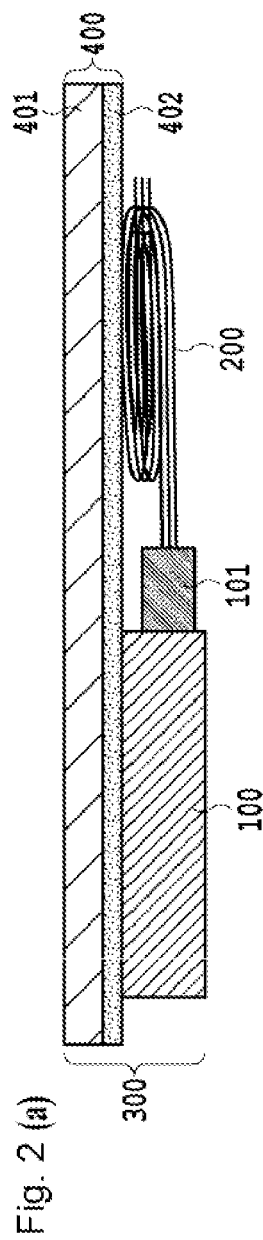
FIG. 2(a) is a cross-sectional view of an optical module according to a first embodiment of the present disclosure.
FIG. 2(b) is a top view of the optical module according to the first embodiment of the present disclosure.
Figure 2:
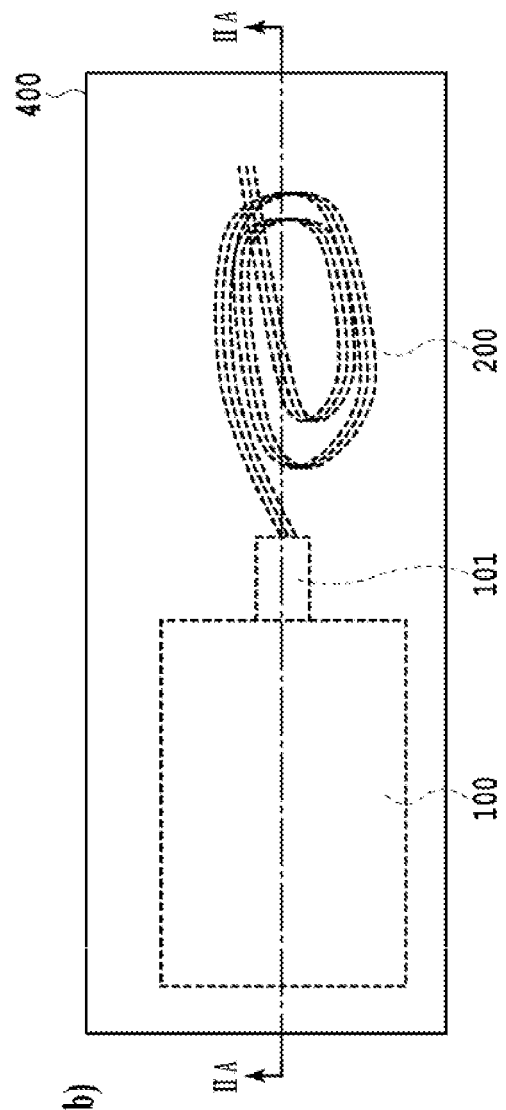

FIGS. 2(a) and 2(b) are a cross-sectional view and a top view illustrating a configuration of an optical module according to a first embodiment of the present disclosure.

As illustrated in FIGS. 2(a) and 2(b), an optical module 300 according to the present embodiment includes: an optical device 100 to which N (N is a positive integer) optical fibers are optically connected; and a carrier 400 including a carrier substrate 401 and an adhesive layer 402 formed at a surface of the carrier substrate. A part of the optical device 100 and a part of the N optical fibers 200 are adhesively fixed to a surface of the adhesive layer 402. Note that an optical fiber block 101 may be used to optically couple the optical device 100 and the optical fibers 200 to each other.

In the present embodiment, an example is illustrated in which the optical device 100 and the optical fibers 200 are optically coupled using the optical fiber block 101. However, other optical coupling mode such as lens coupling may also be employed. In the configuration of the present embodiment, the optical device 100 and the optical fibers 200 are disposed on the same plane, but the adhesive layer may also be provided on top of the carrier to have a portion of the optical fibers fixed to a surface opposite to the optical device 100. In FIG. 2(a), three optical fibers 200 are illustrated, but the number N of optical fibers may be any positive integer.

A high heat resistant special glass epoxy material, aluminum, or the like can be used as the carrier substrate 401 of the carrier 400, for example. Furthermore, the adhesive layer 402 may be formed by directly applying resin at the carrier substrate 401, or may be formed by attaching a sheet-like adhesive layer to the carrier substrate 401.

In the configuration according to the present embodiment, the optical device 100 and the optical fibers 200 are adhesively fixed to the carrier 400. Thus, the optical module 300 of the present embodiment can be sucked, conveyed, and mounted on another substrate as in a case with related-art electronic devices without the optical fibers 200. It is clear from the top view of FIG. 2(b).

Second Embodiment

Figure 3:
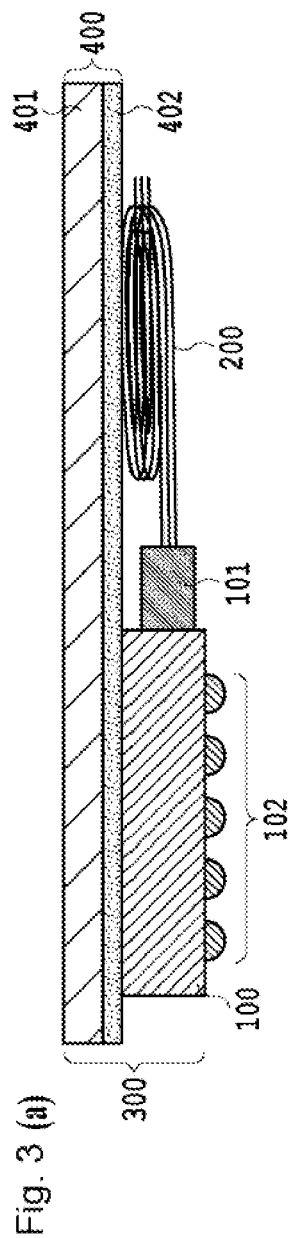
FIG. 3(a) is a cross-sectional view of an optical module according to a second embodiment of the present disclosure.
FIG. 3(b) is a top view of the optical module according to the second embodiment of the present disclosure.
Figure 3:
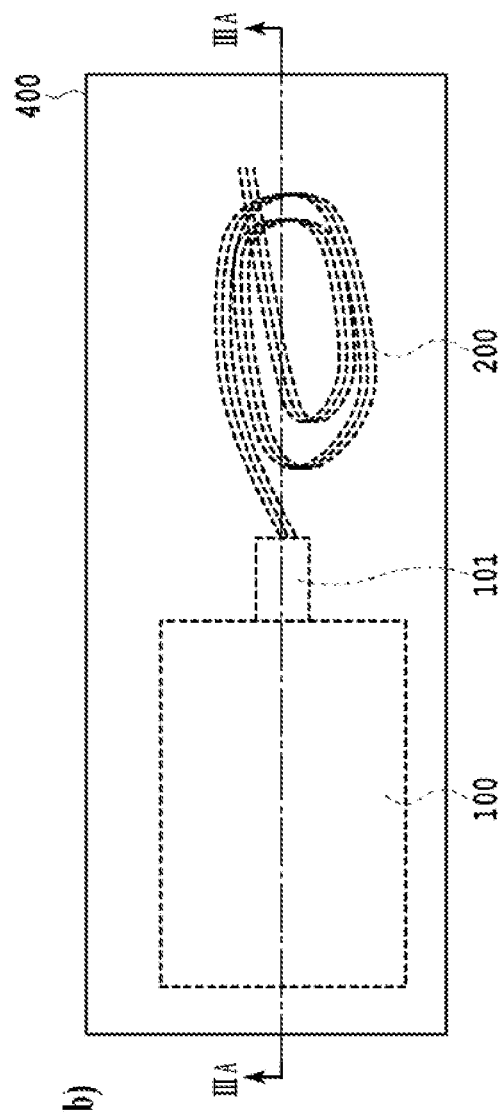

FIGS. 3(a) and 3(b) are a cross-sectional view and a top view illustrating a configuration of an optical module according to a second embodiment of the present disclosure.

As illustrated in FIGS. 3(a) and 3(b), the optical module 300 according to the embodiment of the present disclosure has a configuration obtained by providing ball grid array shaped electrodes (BGA electrodes) 102 on the optical device 100 in the configuration according to the first embodiment.

The BGA electrodes 102 are supposed to be mounted on another substrate or the like by a reflow process. The amount of deformation of the optical fibers 200 due to thermal stress during the reflow heating is limited because the optical fibers 200 are adhesively fixed on the adhesive layer 402. Thus, with the configuration of the present embodiment, the amount of movement of the optical device 100 from a predetermined position during reflow heating can be reduced.

Third Embodiment

Figure 4:
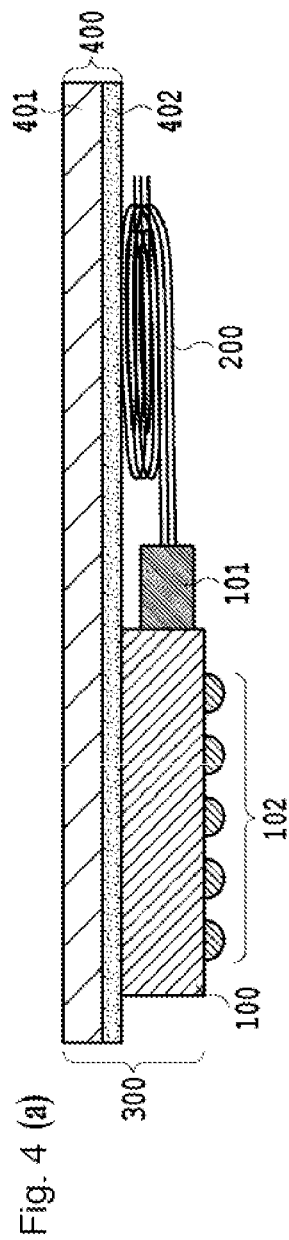
FIG. 4(a) is a cross-sectional view of an optical module according to a third embodiment of the present disclosure.
FIG. 4(b) is a top view of the optical module according to the third embodiment of the present disclosure.
Figure 4:
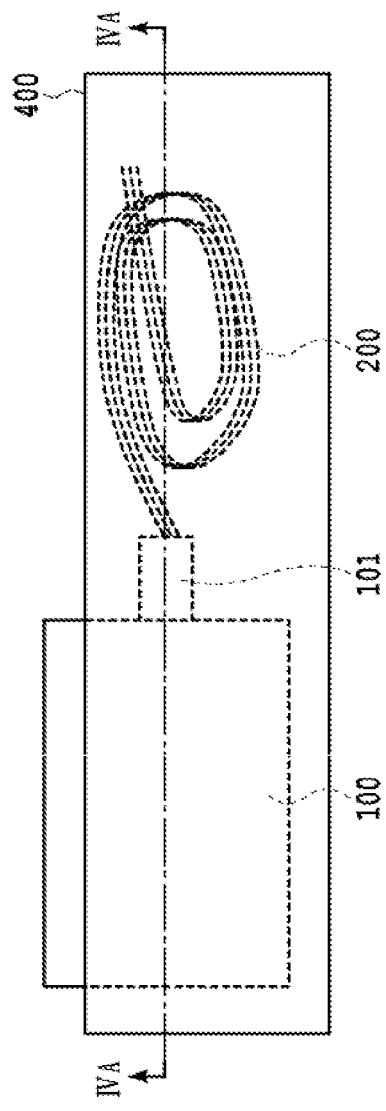

FIGS. 4(a) and 4(b) are a cross-sectional view and a top view illustrating a configuration of an optical module according to a third embodiment of the present disclosure.

As illustrated in FIGS. 4(a) and 4(b), the optical module 300 according to the third embodiment of the present disclosure has a design in which the carrier 400 and the optical device 100 are partially overlaps each other in the configuration according to the second embodiment, so that a part of the optical device 100 can be confirmed from above the carrier 400.

The mounting positioning of the optical device 100 with the BGA electrodes 102 needs to be performed accurately using image recognition techniques. This is because, for example, the ball spacing of the BGA electrodes need to be set to a narrow pitch such as, for example, approximately 500 µm or less, to meet the demand for the downsizing and high-density integration of the optical device 100. However, with the configuration of the second embodiment, the accurate positioning of the optical device 100 is difficult because the position of the optical device cannot be confirmed from top view direction. With the present configuration, at least a part of the optical device 100 can be confirmed from top view direction, so that the optical device having the BGA electrodes formed at a narrow pitch can be mounted at a precise position.

The configuration of the present embodiment enables the upper part of the optical device 100 to be confirmed. Alternatively, a configuration enabling a part of the optical device 100 to be confirmed through a hole opened in the carrier 400 may be employed for example.

Fourth Embodiment

Figure 5:
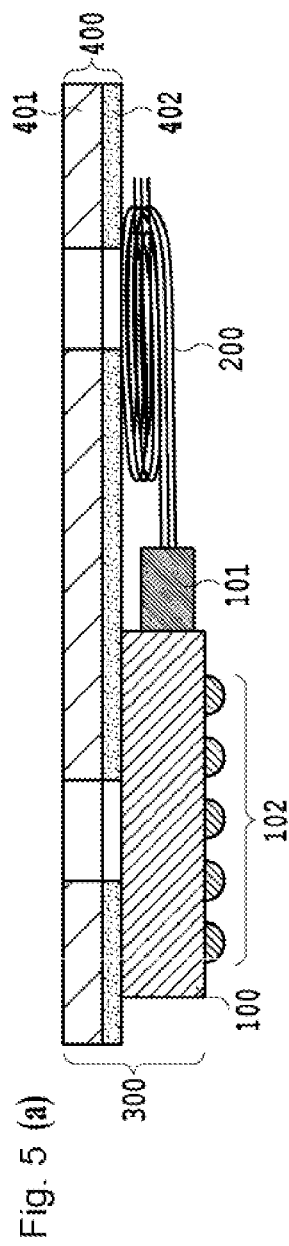
FIG. 5(a) is a cross-sectional view of an optical module according to a fourth embodiment of the present disclosure.
FIG. 5(b) is a top view of the optical module according to the fourth embodiment of the present disclosure.
Figure 5:
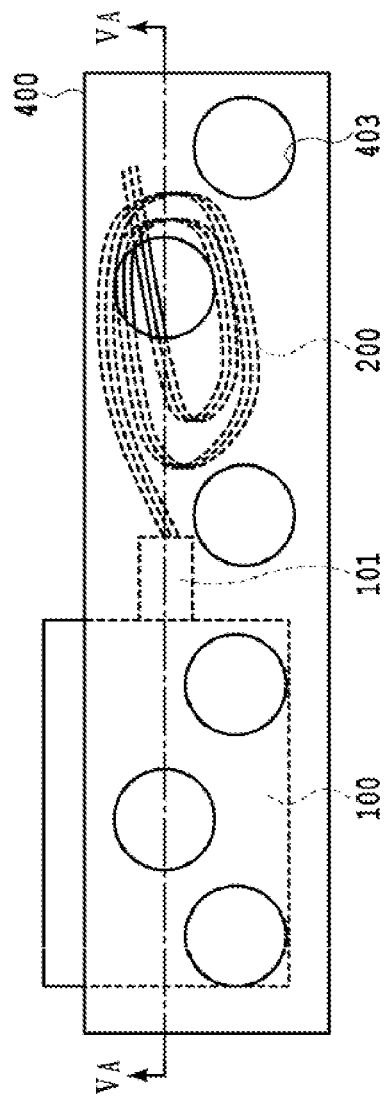

FIGS. 5(a) and 5(b) are a cross-sectional view and a top view illustrating a configuration of an optical module according to a fourth embodiment of the present disclosure.

As illustrated in FIGS. 5(a) and 5(b), the optical module 300 according to the fourth embodiment of the present disclosure has a configuration obtained by providing, with a plurality of holes, the carrier substrate 401 and the adhesive layer 402 of the carrier 400 in the configuration of the third embodiment.

With the configuration of the present embodiment, the weight of the carrier 400 can be reduced. Thus, in a suction conveyance process for mounting the optical module 300, the optical module 300 can be held with a stronger suction force to prevent the optical module 300 from falling off.

Although FIGS. 5(a) and 5(b), illustrate a case of circular holes, the shape of the holes may be any shape. For example, mesh-like holes may be opened.

Fifth Embodiment

FIGS. 6(a) and 6(b) are a cross-sectional view and a top view illustrating a configuration of an optical module according to a fifth embodiment of the present disclosure.

As illustrated in FIGS. 6(a) and 6(b), the optical module 300 according to the fifth embodiment of the present disclosure has a configuration obtained by providing, with a plurality of holes, only the carrier substrate 401 of the carrier 400 in the configuration of the third embodiment.

In the configuration of the present embodiment, a process of removing the carrier 400 from the optical device 100 and the optical fibers 200 after the reflow process can be simplified, while reducing the weight of the carrier 400. Specifically, the carrier 400 is removed while pressing the adhesive layer 402 in holes 404a formed above the optical device 100 among holes 404 formed in the carrier substrate 401, toward the optical device 100 side. As a result, the adhesive layer in the holes 404a is stretched, whereby the optical device is peeled off. Thereby, the carrier 400 can be held and the carrier 400 can be easily removed.

Note that in the present embodiment, the adhesive layer 402 is formed by attaching an adhesive film to the substrate.

Sixth Embodiment

Figure 7A:
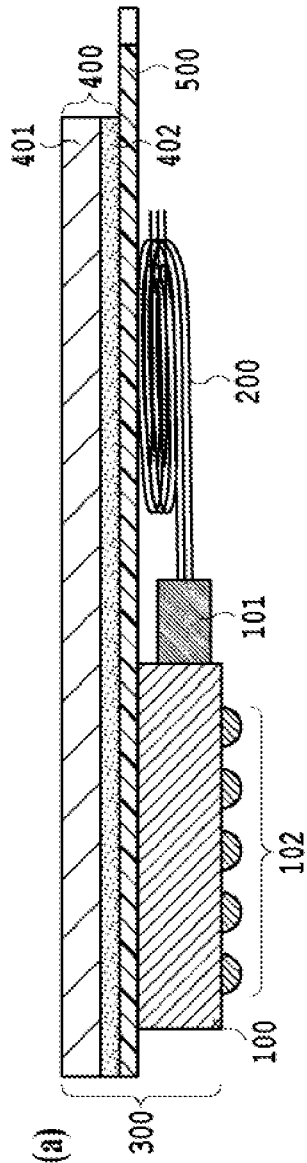
FIG. 7(a) is a cross-sectional view of an optical module according to a sixth embodiment of the present disclosure.
Figure 7B:
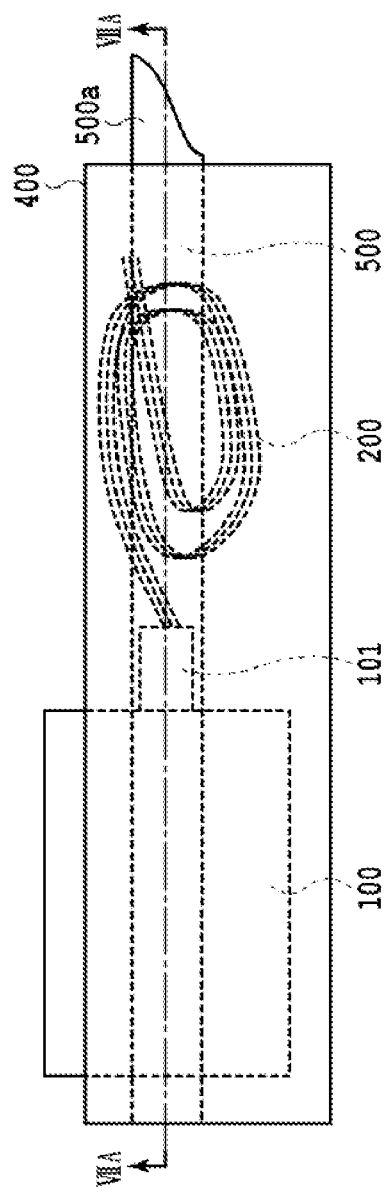
FIG. 7(b) is a top view of the optical module according to the sixth embodiment of the present disclosure.

FIGS. 7(a) and 7(b) are a cross-sectional view and a top view illustrating a configuration of an optical module according to a sixth embodiment of the present disclosure.

As illustrated in FIGS. 7(a) and 7(b), the optical module 300 according to the sixth embodiment of the present disclosure is obtained with a carrier peeling film 500 provided between the carrier 400 and the optical device 100 and between the carrier 400 and the optical fibers 200, in the configuration of the third embodiment.

This configuration can simplify a process for removing the carrier 400 after the optical module 300 is mounted, using a method different from that described in the fifth embodiment. Specifically, in removing the carrier 400, the carrier 400 can be easily peeled off by pulling up a portion 500a of the film that can be confirmed from top view direction.

In the example of the present embodiment, the portion of the film that does not overlap with the carrier 400 (the portion 500a) can be confirmed from above the carrier. Furthermore, at a plurality of locations, the portion of the film may also be confirmed from above the carrier. Furthermore, the shape of the film 500 may not be rectangular, and may be designed to achieve a good balance between the removability and the adhesiveness.

Seventh Embodiment

Figure 8A:
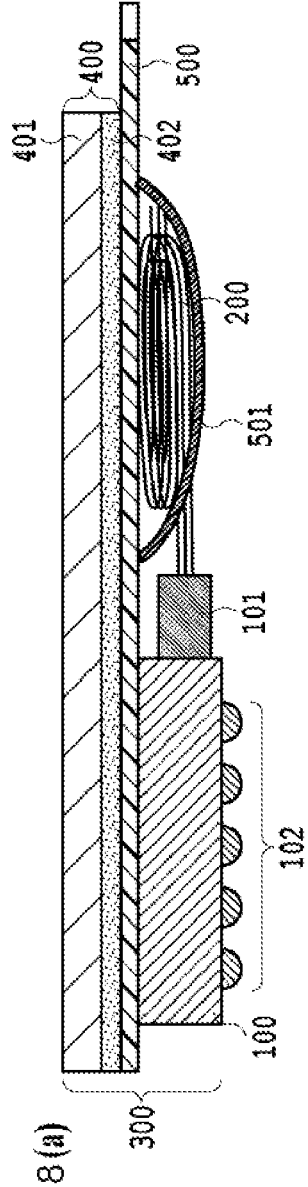
FIG. 8(a) is a cross-sectional view of an optical module according to a seventh embodiment of the present disclosure.
Figure 8B:
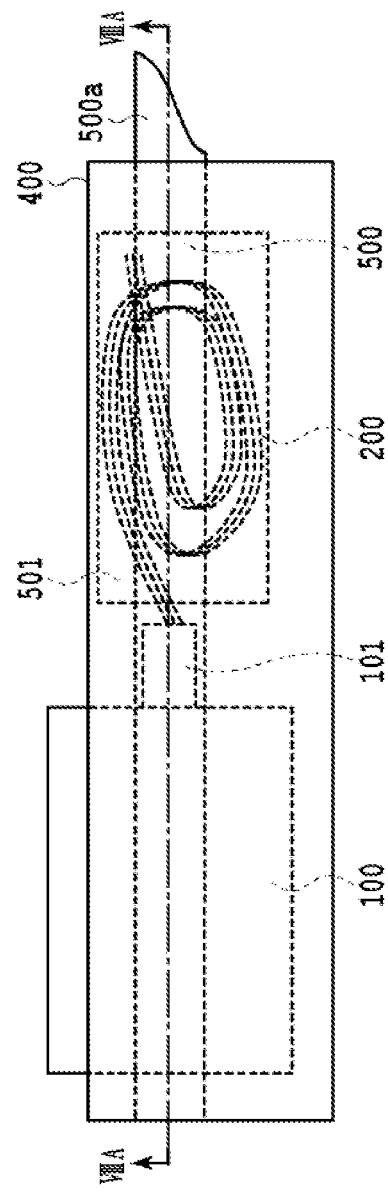
FIG. 8(b) is a top view of the optical module according to the seventh embodiment of the present disclosure.

FIGS. 8(a) and 8(b) are a cross-sectional view and a top view illustrating a configuration of an optical module according to a seventh embodiment of the present disclosure.

As illustrated in FIGS. 8(a) and 8(b), the optical module 300 according to the seventh embodiment of the present disclosure, a peeling prevention (falling prevention) member 501 is provided on a surface of the optical fibers 200 not in contact with the adhesive layer 402, in the configuration described in the sixth embodiment. This member can prevent the optical fibers from peeling off from the adhesive layer to disable suction conveyance during the mounting.

In the present embodiment, a film is used as the peeling prevention member. However, the effect described above can be obtained with a plate-shaped or strip-shaped member similarly attached instead of the film. The plate-shaped or strip-shaped member may be a material that can withstand the heating process or the reflow process. Preferably, a member similar to the carrier substrate is used. Examples of such a member include high heat resistant special glass epoxy material, aluminum, and the like.

INDUSTRIAL APPLICABILITY

The present disclosure can be applied to a component for optical communication, and more specifically, can be applied to an optical module that can be reflowed having a carrier on which an optical device and optical fibers are adhesively fixed, so that suction conveyance and mounting can be performed using a mounter and the like.

REFERENCE SIGNS LIST

100 Optical device
101 Optical fiber block
102 BGA electrodes
200 Optical fibers
300 Optical module
400 Carrier
401 Carrier substrate
402 Adhesive layer
403 Hole
404 Hole
404a Hole
500 Film
500a Portion of film
501 Peeling prevention (falling prevention) member

The invention claimed is:
1. An optical module comprising:
an optical device to which N optical fibers are optically connected, N being a positive integer; and
a carrier including a substrate and an adhesive layer formed at a surface of the substrate, wherein an adhesive fixing of a part of the optical device and a part of the N optical fibers are performed on a surface of the adhesive layer, wherein a peeling film is disposed between the adhesive layer and the optical device and between the adhesive layer and the N optical fibers, in order to peel off the optical device and the N optical fibers from the adhesive layer of the carrier.

2. The optical module according to claim 1, wherein the optical device includes ball grid array shaped electrodes.

3. The optical module according to claim 1, wherein the adhesive fixing is performed so that the carrier partially overlaps with the optical device when viewed from above the carrier.

4. The optical module according to claim 1, wherein the substrate of the carrier and the adhesive of the carrier are provided with a plurality of holes.

5. The optical module according to claim 1, wherein in the carrier, only the substrate is provided with a plurality of holes and the adhesive layer is provided with no hole.

6. The optical module according to claim 1, wherein a peeling prevention member is disposed on a non-adhered surface of the N optical fibers fixed to the carrier.

7. The optical module according to claim 6, wherein the peeling prevention member is a film, or is a strip-shaped member or a mesh-like member.

* * * * *